United States Patent Office 3,028,358
Patented Apr. 3, 1962

3,028,358
COMPOSITION COMPRISING BUTYL RUBBER, A PHENOL, TRIOXANE AND A METAL HALIDE, VULCANIZATE OBTAINED THEREFROM, AND PROCESS FOR PREPARING SAME
Peter L. Rosamilia, Newark, N.J., assignor to Minnesota Mining and Manufacturing Company, St. Paul, Minn., a corporation of Delaware
No Drawing. Filed Feb. 26, 1959, Ser. No. 795,576
14 Claims. (Cl. 260—43)

This invention relates to novel compositions of matter and to methods for preparing them. More particularly this invention is directed to novel compositions of matter which either with or without butyl rubber as a component thereof are compositions of matter which may be materials of commerce, finding utility in a number of different fields.

In one of its more specific aspects, the invention is directed to novel compositions of matter, which I shall term Materials I. Each of said Materials I at room temperature comprises an intimate combination of Material A, which is one or a combination of two or more aldehyde-reactive phenols and Material B, which is trioxane, with said Material B being substantially uniformly distributed or dispersed throughout Material A. If desired, said Material I may also include one or more of the conventional components normally employed in the processing of butyl rubber. The ratio by weight of Material A to Material B in Material I may vary over wide limits depending upon the ultimate use of such Material I, but in general is in the range 100 parts by weight of Material A to at least 10 and generally 10–120, and preferably at least 25 and generally 25–75, parts by weight of Material B.

Such aldehyde-reactive phenols, Materials A, are phenols capable of being reacted with formaldehyde in the presence of an acidic catalyst. Such phenols which are preferably employed are those which are soluble in hot heptane and which may be reacted with formaldehyde in the presence of an acidic catalyst to provide resinous reaction products which are thermosetting. It is also preferable to employ such phenols which are liquid at 270° F. and for some purposes such phenols which are liquid in the range of 120° F. to 270° F. Specific examples of some of such phenols are octyl phenol, nonyl phenol, 3-n-pentadecyl phenol, 5-n-pentadecyl resorcinol, etc.

In the course of my experimentations, I made the startling discovery that I may intimately combine butyl rubber with Materials A and B and a catalyst, and with or without other butyl rubber additives, to provide butyl rubber stocks which may be vulcanized to provide useful vulcanization products finding use in the fields of curing bags of various types, hose, belts, inner tubes, tires, etc. The catalysts employed are cationic alkylation catalysts and specific examples of some of them are stannous chloride, ferric chloride, zinc chloride, etc. The ratio by weight of Material A to Material B is 100 parts of A to at least 10 and generally 10–120, and preferably at least 25 and generally 25–75, parts of B; and the ratio by weight of the butyl rubber to the combined weights of Materials A and B is preferably in the ratio range of 100 parts of butyl rubber to at least 4 and generally about 4–50 parts of the combined weights of Materials A and B.

The term "vulcanization" as employed herein is used in its commonly accepted sense and has reference to the process for converting butyl rubbers from the raw state in which they are weak materials having the typical properties of a plastic gum into a strong non-plastic typically elastic material. Unvulcanized or uncured butyl rubbers like other elastomers have no definite elastic limit, that is, upon slow application of tensile stress, they elongate or string out almost indefinitely without breaking and exhibit very little, if any elastic recovery after the stress is removed. On the other hand, vulcanized or cured butyl rubbers according to this invention, in common with other typical elastomers have definite elastic limits, as well as ability to return to substantially their original length after being stretched, that is, they exhibit high elastic recovery.

Butyl rubbers are well known commercial synthetic rubbers made by copolymerizing an isoolefin, usually isobutylene, with a minor proportion of a conjugated diolefin, usually isoprene or butadiene. The isoolefins used generally have from 4 to 7 carbon atoms, and such isomonoolefins as isobutylene or ethyl methyl ethylene are preferred. The diolefins employed usually are ordinary open-chain conjugated diolefins having from 4 to 8 carbon atoms, among which may be mentioned, in addition to the commonly used isoprene or butadiene, such compounds as piperylene; 2,3-dimethyl-1,3-butadiene; 3-methyl-1,3-pentadiene; 2-methyl-1,3-pentadiene; 1,3-hexadiene; and 2,4-hexadiene. The butyl rubbers contain only relatively small amounts of copolymerized diene, typically from about 0.5 to 5% and seldom more than 10%, on the total weight of the elastomer. For the sake of convenience and brevity, the various possible synthetic rubbers within this class will be designated generally by the term butyl rubber.

In accordance with this invention, some of the novel compositions of this invention, namely novel stocks, may be produced by milling or mixing together on a cool rubber mill, or Banbury mixer or the like butyl rubber and Materials A and B in the proportions heretofore set forth, and also a small proportion, say approximately 2–6%, of said acidic catalyst until the components are substantially uniformly distributed with respect to each other. Such stocks either with or without other conventional butyl rubber additives, such as carbon black, stearic acid, etc. may be cured in the temperature range of 275–400° F. to provide useful vulcanizates.

The following examples are given merely by way of ilustration and not limitation, of illustrative examples of this invention, all parts in these examples, as well as any other instance of use in the present description and claims are by weight, unless otherwise specified:

Example Ia 10 parts of 3-n-pentadecyl phenol and 5 parts of trioxane were heated together until solution occurred. The source of heat was removed and the solution was chilled quickly to room temperature and at that temperature was a solid, and is hereinafter known as Material Ia.

Example Ib 15 parts of 5-n-pentadecyl resorcinol and 10 parts of trioxane were heated together until solution occurred. The source of heat was removed and the solution was chilled quickly to room temperature and at that temperature was a solid, and is hereinafter known as Material Ib.

Said materials Ia and Ib have melting points of at least 120° F. and no greater than 270° F.

Example 1

100 parts of butyl rubber No. 268, 50 parts of "Philblack O" (carbon black), 1 part of stearic acid, 4 parts of $SnCl_2 \cdot 2H_2O$, 15 parts of 3-n-pentadecyl phenol and 10 parts of trioxane were milled together on a cool rubber mill to substantially uniformly distribute said components with respect to each other, thereby to provide Stock 1.

Example 2

100 parts of butyl rubber No. 268, 50 parts of "Philblack O" (carbon black), 1 part of stearic acid, 4 parts of $SnCl_2 \cdot 2H_2O$, and 10 parts of 5-n-pentadecyl resorcinol and 6 parts of trioxane were milled together on a cool rubber mill to substantially uniformly distribute said components with respect to each other, thereby to provide Stock 2.

Example 3

100 parts of butyl rubber No. 268, 50 parts of "Philblack O" (carbon black), 1 part of stearic acid, 4 parts of $SnCl_2 \cdot 2H_2O$, and 12 parts of octyl phenol and 8 parts of trioxane were milled together on a cool rubber mill to substantially uniformly distribute said components with respect to each other, thereby to provide Stock 3.

Example 4

100 parts of butyl rubber No. 268, 50 parts of "Philblack O" (carbon black), 1 part of stearic acid, 4 parts of $SnCl_2 \cdot 2H_2O$, and 10 parts of nonyl phenol and 8 parts of trioxane were milled together on a cool rubber mill to substantially uniformly distribute said components with respect to each other, thereby to provide Stock 4.

Example 5

100 parts of butyl rubber No. 268, 50 parts of "Philblack O" (carbon black), 1 part of stearic acid, 4 parts of $SnCl_2 \cdot 2H_2O$, 15 parts of material Ia were milled together on a cool rubber mill to substantially uniformly distribute said components with respect to each other, thereby to provide Stock 5.

Example 6

100 parts of butyl rubber No. 268, 50 parts of "Philblack O" (carbon black), 1 part of stearic acid, 4 parts of $SnCl_2 \cdot 2H_2O$, and 25 parts of material Ib were milled together on a cool rubber mill to substantially uniformly distribute said components with respect to each other, thereby to provide Stock 6.

All of said Stocks 1–6, respectively, were separately and individually cured in a press at 330° F. for 30 minutes to provide Vulcanizates 1–6, respectively, which were tested, the results were recorded and were as follows:

| Vulcanizate | Shore Hardness | 300% Modulus | Tensile | Percent Elongation |
| --- | --- | --- | --- | --- |
| 1 | 63 | 1,310 | 2,050 | 450 |
| 2 | 67 | 1,245 | 2,125 | 475 |
| 3 | 61 | 1,450 | 2,080 | 700 |
| 4 | 55 | 750 | 1,350 | 800 |
| 5 | 65 | 1,475 | 2,250 | 550 |
| 6 | 70 | 1,350 | 2,175 | 525 |

A comparison of the results obtained and recorded in the foregoing table establishes that the employment of the various materials A and B in the stock, when subsequently cured imparts to the vulcanizate an unexpected combination of properties, namely, high 300% modulus and tensile strength, with high elongation.

Said "butyl rubber No. 268" herein referred to is of course a butyl rubber of commerce which is described in the publication "Butyl Rubber" of Enjay Company, Inc. published in 1957. Said butyl rubber "268" is produced by copolymerizing isobutylene with small amount of isoprene, and has a Mooney viscosity ML212F at 8 min. of 71–80 and a mol percent unsaturation of 1.5–2.0.

In referring to the phenols being soluble in hot heptane, I mean that a 10 gram sample of any of such phenols is capable of forming a solution with 40 grams of heptane maintained at 80° C.

Of course, it is to be understood that the acidic catalyst employed may be other than those heretofore specifically set forth. In general, the acidic catalyst acts as a catalyst and/or accelerator. The acidic catalyst is a cationic alkylation catalyst, and preferably is aluminum halide or a heavy metal halide exemplified by such other known stable alkylation halides as tin chloride, zinc chloride, iron chloride and, in general, halides of the various metals usually classified as heavy metals (cf. the periodic chart of the elements in "Introductory College Chemistry" by H. G. Deming, published by John Wiley & Sons, Inc.). This class includes, inter alia, chromium chloride and nickel chloride, as well as cobalt chloride, manganese chloride, copper chloride, etc. Although copper halides function as alkylation catalysts, it is preferable not to use them because of the deleterious effect of copper on the butyl rubber in other respects. The heavy metal chlorides constitute the preferred class of cationic alkylation catalysts for use in the present invention. However, heavy metal salts of other halides such as aluminum bromide and stannic iodide may be employed. Aluminum fluoride also may be used, although aluminum fluoride is not particularly desirable because of its high melting point and corrosiveness. Similarly, aluminum chloride is not particularly preferred. Of the heavy metal chlorides, the most preferred are those of tin, iron, and zinc. The heavy metal halides are effective independently of the state of oxidation of the metal, and they are even effective if the halide is partially hydrolyzed, or is only a partial halide, as in zinc oxychloride. While stannous chloride is the preferred catalyst, it is to be understood that said other heavy metal halides are equivalents.

Since certain changes in carrying out the above process and certain modifications in the compositions embodying the invention may be made without departing from its scope, it is intended that all matter contained in the above description shall be interpreted as illustrative and not in a limiting sense. It is also to be understood that other materials may be added to our novel compositions of matter herein claimed without departing from the spirit of the invention. Particularly, it is to be understood that in said claims, ingredients or components recited in the singular are intended to include compatible mixtures of said ingredients wherever the sense permits.

This application is a continuation-in-part of my copending application Ser. No. 738,303 of May 28, 1958, now abandoned.

I claim:

1. A novel composition of matter comprising an aldehyde-reactive phenol, trioxane, and a catalyst in intimate combination with a rubbery copolymer of an isoolefin having from 4–7 carbon atoms with from 0.5–10% of a conjugated diolefin having 4–8 carbon atoms, said catalyst being a metal halide with said metal selected from the group consisting of aluminum and heavy metals, said phenol being capable of solution in hot heptane and capable of being reacted with formaldehyde in the presence of an acidic catalyst for the production of thermosetting resinous material.

2. A novel composition of matter defined in claim 1, with said phenol being octyl phenol.

3. A novel composition of matter defined in claim 1, with said phenol being nonyl phenol.

4. A novel composition of matter defined in claim 1, with said penol being 3-n-pentadecyl phenol.

5. A novel composition of matter defined in claim 1, with said phenol being 5-n-pentadecyl resorcinol.

6. A vulcanizate produced by heating a composition of matter defined in claim 1.

7. A vulcanizate produced by heating a composition of matter defined in claim 2.

8. A vulcanizate produced by heating a composition of matter defined in claim 3.

9. A vulcanizate produced by heating a composition of matter defined in claim 4.

10. A vulcanizate produced by heating a composition of matter defined in claim 5.

11. A novel composition of matter comprising an aldehyde-reactive phenol, trioxane, and a catalyst in intimate combination with a rubbery copolymer of an isoolefin having from 4–7 carbon atoms with from 0.5–10% of a conjugated diolefin having 4–8 carbon atoms, said catalyst being a metal halide with said metal selected from the group consisting of aluminum and heavy metals, said phenol being capable of solution in hot heptane and capable of being reacted with formaldehyde in the presence of an acidic catalyst for the production of thermosetting resinous material, the ratio by weight of said phenol to trioxane being 100 parts of said phenol to at least 10 parts of trioxane, and the ratio by weight of said copolymer to the sum of the weights of said phenol and trioxane being 100 parts of copolymer to at least 4 parts of the sum of the weights of said phenol and trioxane.

12. The method comprising blending together an aldehyde-reactive phenol, trioxane, a catalyst, and a rubbery copolymer of an isoolefin having from 4–7 carbon atoms with from 0.5–10% of a conjugated diolefin having 4–8 carbon atoms, said catalyst being a metal halide with said metal selected from the group consisting of aluminum and heavy metals, said phenol being capable of solution in hot heptane and capable of being reacted with formaldehyde in the presence of an acidic catalyst for the production of thermosetting resinous material.

13. The method comprising blending together an aldehyde-reactive phenol, trioxane, stannous chloride, and a rubbery copolymer of an isoolefin having from 4–7 carbon atoms with from 0.5–10% of a conjugated diolefin having 4–8 carbon atoms, said phenol being capable of solution in hot heptane and capable of being reacted with formaldehyde in the presence of an acidic catalyst for for the production of thermosetting resinous material.

14. The method comprising blending together a rubbery copolymer of an isoolefin having from 4–7 carbon atoms with from 0.5–10% of a conjugated diolefin having 4–8 carbon atoms, a catalyst and a precombined composition of matter comprising an aldehyde-reactive phenol and trioxane, with the ratio by weight of said phenol to said trioxane being 100 parts of said phenol to at least 10 parts of said trioxane, said catalyst being a metal halide with said metal selected from the group consisting of aluminum and heavy metals, said phenol being capable of solution in hot heptane and capable of being reacted with formaldehyde in the presence of an acidic catalyst for the production of thermosetting resinous material, the ratio by weight of said copolymer to the sum of the weights of said phenol and trioxane being 100 parts of said copolymer to at least 4 parts of the combined weights of said phenol and trioxane.

References Cited in the file of this patent

UNITED STATES PATENTS

| | | |
|---|---|---|
| 2,304,431 | Walker | Dec. 8, 1942 |
| 2,649,431 | Little | Aug. 18, 1953 |
| 2,726,224 | Peterson et al. | Dec. 6, 1955 |